H. C. ROOT.
SAW-SET AND FILE-GUIDE.
No. 193,182.  Patented July 17, 1877.
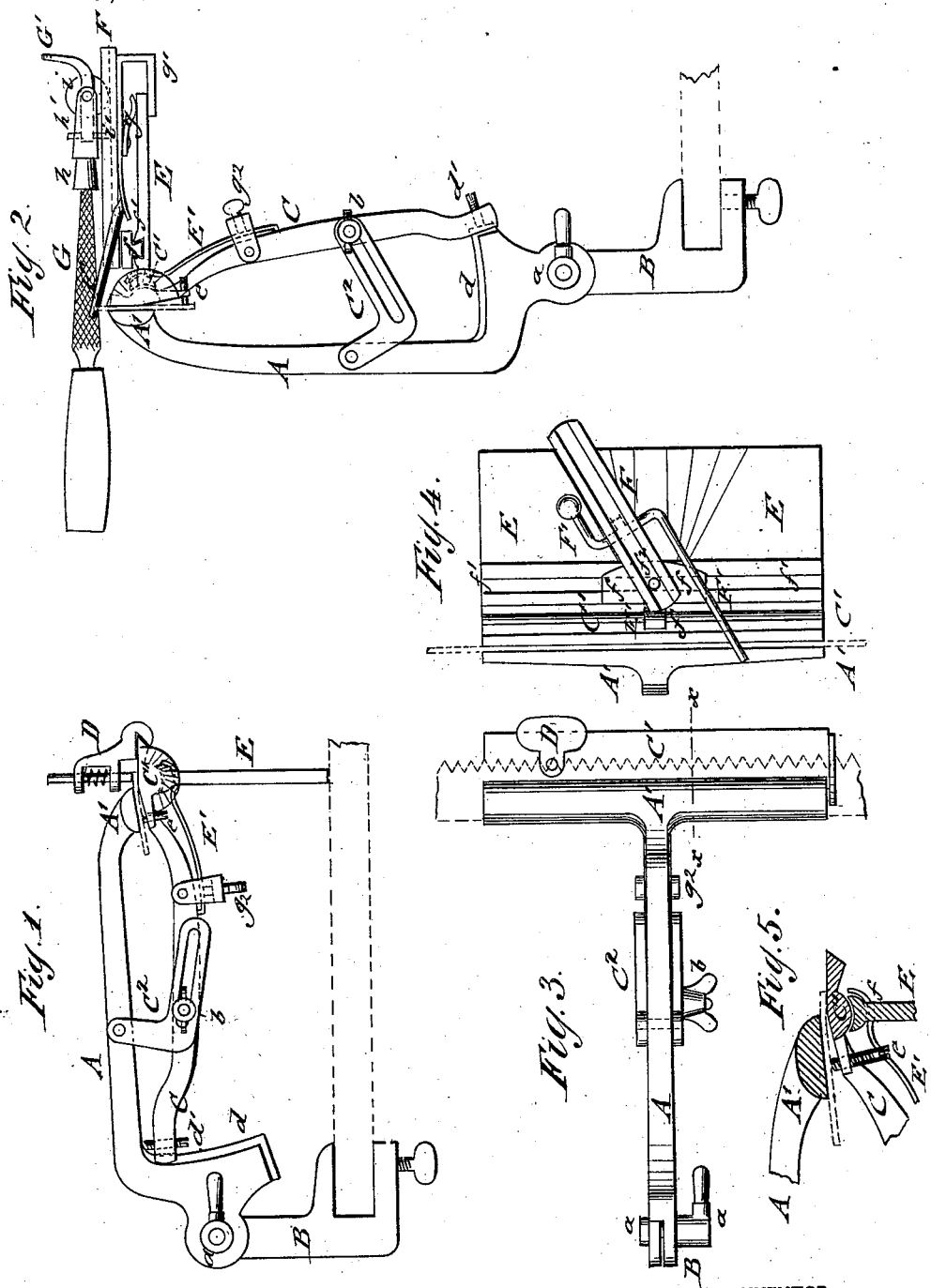

UNITED STATES PATENT OFFICE.

HENRY C. ROOT, OF VIRGINIA CITY, NEVADA.

IMPROVEMENT IN SAW-SET AND FILE-GUIDE.

Specification forming part of Letters Patent No. 193,182, dated July 17, 1877; application filed January 19, 1877.

*To all whom it may concern:*

Be it known that I, HENRY C. ROOT, of Virginia City, in the county of Storey and State of Nevada, have invented a new and Improved Saw-Set and File-Guide, of which the following is a specification:

In the accompanying drawing, Figures 1 and 2 represent side views of my improved saw filing and setting device, showing the same, respectively, in position for setting and for filing the teeth of a saw. Figs. 3 and 4 are top views of the same, respectively, as used for setting and filing; and Fig. 5 shows a detail vertical transverse section of the holding-jaws with the swinging table.

Similar letters of reference indicate corresponding parts.

The object of my invention is to furnish a simple and reliable device by which the teeth of a saw may be set and filed in convenient manner, the device being readily adjusted on a bench or other support for either operation, and used for either purpose, as required.

The invention consists, essentially, in the adjustable clamping-jaws pivoted to and secured by a clamp-piece to the bench or table, and the combination therewith of parts necessary to the adaptation of the device to the purpose of setting a saw or filing it, interchangeably, as will be hereinafter more fully described, and then pointed out in the claims.

In the drawing, A represents the main arm, and C the adjustable arm, of the two saw-clamping jaws A' and C¹, that hold the saw to expose the teeth of the same for the setting or filing operation. The arm A is pivoted and secured by a fastening-screw, $a$, to a clamp, B, which is rigidly attached to the working bench or table. The jaw arm or lever C is connected by a slotted elbow-lever, C², to the arm A, being pivoted to arm A, and clamped tightly to arm C by a set-screw, $b$, running in the slot. The grooved end of the arm C, opposite the jaw end, runs along a raised and concaved guide, $d$, of arm A, and is adjusted by means of the elbow-lever, either directly to the arm A or to the outer end of the same, and set to the required position thereto by a regulating-screw, $d'$. The lower jaw C¹ is made angular, the inner section running off at an oblique angle from the plane of the outer section. The saw is firmly held between jaws A' and C¹ and set-screws $e$, being adjusted by elbow-lever C² and clamp-screw $b$, so that the teeth that project over the apex of the angle of the lower jaw C¹ may be set by a spring saw-set, D, formed with a groove corresponding to the upper edge of jaw C¹, and being moved along said jaw with one hand, while the setting is done by the strokes of a hammer.

The firm clamping of the saw is secured by the set-screw $d'$ of the arms of the jaws, while the greater or less set of the teeth is obtained by the position in which the jaw C¹ is clamped to jaw A' by the elbow-lever and clamp-screw.

A table, E, swings along the convex or epicycloidal under side of jaw C¹, and is securely clamped thereto by a strong band-spring, E', that enters by its hook end a recess, $f$, of the table, and takes firmly hold of the same by a set-screw, $g^2$, at the opposite end of the spring E'. The table E serves, when the device is employed for setting the teeth, as a support to the jaws, its lower edge resting upon the table or bench, as shown in Fig. 1, while it is retained in horizontal or any other position, when the device is used for filing the teeth, as shown in Fig. 2, by the binding action of the spring-clamp E'.

When the table E is adjusted for the purpose of filing the saw-teeth, the file-guide F is applied thereto by a dovetailed piece, $f$, running in a longitudinal guide-groove, $f^1$, of the table. The file-guide F is pivoted to the piece $f$, and secured at any desired angle to the center-line of the table by the clamping pivot-screw $f^2$. The different angles to which the guide F may be adjusted are marked off at both sides of the center-line of the table by suitable lines of graduation.

The guide F is further retained on the table by a spring, $g$, and exterior binding-arm or holder $g^1$, and set exactly to the teeth by a swinging and spring-acted arm, F', that is fulcrumed to the guide F, and placed by its front end into one of the teeth of the saw, being raised and lowered by its rear end or handle part, for admitting the ready forward moving of the guide and setting to the next tooth. The file G is seated with its outer end into a socket, $h$, that corresponds to the shape of the file, and has an exterior conical surface, said cone carrying a fork-shaped extension, $h'$, in which it can be turned to adjust the file to the angle desired, and to which a curved handle, $G'$, Fig. 2, is fulcrumed. The part of the handle $G'$ inside of the forked extension $h'$ carries a pulley, $i$, and a small brush, $i'$, in front of the same, of which the pulley runs in the groove of guide F, while the brush serves to clear the grooves of the filings. The curved handle $G'$ is taken hold of with the left hand, and the handle of the file G with the right hand, and thus the filing of the saw-teeth is accomplished with great facility and at any depth or inclination required.

The apparatus forms a convenient means of filing and setting the teeth of the saws by any one without requiring special skill, the same being readily set and secured in the position required for the different operations.

Having thus described my invention, I claim as new and desire to secure by Letters Patent—

1. The combination of the swinging and clamping jaws A A' and C $C^1$, and slotted, pivoted, and clamped elbow-lever $C^2$, and set-screw $d'$, with the clamp-piece B, substantially in the manner and for the purpose set forth.

2. The combination, with the swinging table and jaws A' $C^1$, of the longitudinally-sliding and swinging guide F, secured, by clamp-screw $f^2$, spring $g$, and holder $g'$, thereto, substantially as described.

3. The combination, with the grooved adjustable guide F and jaws A' $C^1$, of a fulcrumed arm, F', resting on one of the saw-teeth for retaining the file, substantially as set forth.

4. The combination of the jaws A' $C^1$, grooved guide F, and fulcrumed arm F' with a file-holding socket, $h$, and with a pivot-handle, G', having guide-pulley and clearing-brush, substantially in the manner and for the purpose set forth.

HENRY C. ROOT.

Witnesses:
E. DAVIS,
S. E. HOISINGTON.